United States Patent [19]

Albrecht

[11] Patent Number: 4,575,775

[45] Date of Patent: Mar. 11, 1986

[54] MAGNETIC RECORDING DISK HAVING A SECTOR SERVO PATTERN FOR USE WITH A MULTIPLE ELEMENT HEAD

[75] Inventor: David W. Albrecht, San Jose, Calif.

[73] Assignee: International Business Machines Corporation, Armonk, N.Y.

[21] Appl. No.: 644,244

[22] Filed: Aug. 27, 1984

[51] Int. Cl.$^4$ .............................................. H04N 5/56
[52] U.S. Cl. ...................................................... 360/77
[58] Field of Search ................................... 360/77, 78

[56] References Cited

U.S. PATENT DOCUMENTS

| 3,185,972 | 5/1965 | Sippel | 340/174.1 |
| 3,593,333 | 7/1971 | Oswald | 340/174.1 |
| 4,048,660 | 9/1977 | Dennison et al. | 360/77 |

FOREIGN PATENT DOCUMENTS

| 54-135520 | 10/1979 | Japan | 360/78 |
| 55-34303 | 10/1980 | Japan | 360/78 |
| 56-16966 | 2/1981 | Japan | 360/78 |

*Primary Examiner*—George G. Stellar
*Attorney, Agent, or Firm*—Thomas R. Berthold

[57] ABSTRACT

A magnetic recording disk contains a sector servo pattern for use in a disk file with a multiple element head. The pattern of servo signals is a plurality of segments spaced along radially extending sectors, the sectors being equally angularly spaced around the disk surface. For data track following by the head as the disk rotates, elements of the multiple element head are alternately switched into the servo system so that each element reads the servo signal in the data track in which it is aligned.

7 Claims, 3 Drawing Figures

MAGNETIC RECORDING DISK HAVING A SECTOR SERVO PATTERN FOR USE WITH A MULTIPLE ELEMENT HEAD

BACKGROUND OF THE INVENTION

This invention relates to servomechanisms for position control of the read and write transducers on the rotating disk of a magnetic recording disk file, and in particular to a magnetic recording disk having a specific pattern of pre-recorded servo signals for providing sampled position signals to the control system.

In certain magnetic recording disk files which have a relatively high density of data tracks, it is necessary to provide servo control of the read and write heads to both maintain the heads over the tracks in the presence of various disturbances and to quickly and accurately position the heads to other tracks for subsequent read and write operations. In order to accomplish this, certain conventional disk files utilize pre-recorded servo signals on either a dedicated servo disk or the data disk to provide a position error signal (PES) to the control system. One well known method of incorporating this servo information is to record the information on a separate dedicated disk and use a servo read head on that disk to imply the location of read/write heads on the same actuator on other data disks within a given tolerance limit. In this scheme, the control system can receive a continuous PES to permit very accurate positioning of the servo head, but the read/write heads suffer track misalignment to a given tolerance limit due to thermal effects and mechanical effects such as disk flutter. Another well known method of incorporating this servo information is to place pre-recorded servo signals on equally angularly spaced sectors which extend out radially from the data disk center. Thus, as the disk rotates, the read/write head or a dedicated servo read head receives sampled position signals as the sectors pass beneath the head. Because in this method the sectors of servo information are recorded on the disk between sectors of data, there is less surface area available on the disk for data. Typically the sector servo pattern occupies from 10% to 20% of the available disk recording surface area. While it is thus desirable to minimize the amount of disk surface area required for the servo information, it is also necessary to maximize the number of servo sectors in order to obtain as high a sampling rate as possible to generate the PES for the control system.

SUMMARY OF THE INVENTION

The present invention is a disk having an improved sector servo pattern for use in a disk file having a multiple element head. The pattern comprises a plurality of angularly spaced-apart sectors in which each sector includes radially spaced-apart segments of pre-recorded servo information. The segments on any one sector are circumferentially coincident with the gaps between segments on adjacent sectors and the radial length of each segment is approximately equal to the spacing between the elements of the multiple element head. During track following, switching circuitry automatically switches in each of the elements in the multiple element head for reading the servo signal from that segment radially aligned with the active element.

Thus, the present invention provides two alternate possibilities for improving the conventional sector servo pattern when a multiple element head is used in the disk file. First, if the same surface area of the conventional sector servo pattern is allowed for the pattern of the present invention, then the sample rate of the servo signals is increased by a factor equal to the number of elements in the multiple element head. Alternatively, if it is desired to reduce the surface area dedicated to servo signals, then only a fraction of the surface area required for the conventional sector servo pattern is required, that fraction being approximately equal to 1/N, where N is the number of elements in the multiple element head.

For a fuller understanding of the nature and advantages of the present invention, reference should be made to the following description taken in conjunction with the accompanying drawings.

DESCRIPTION OF THE PREFERRED EMBODIMENTS

Figure 1:
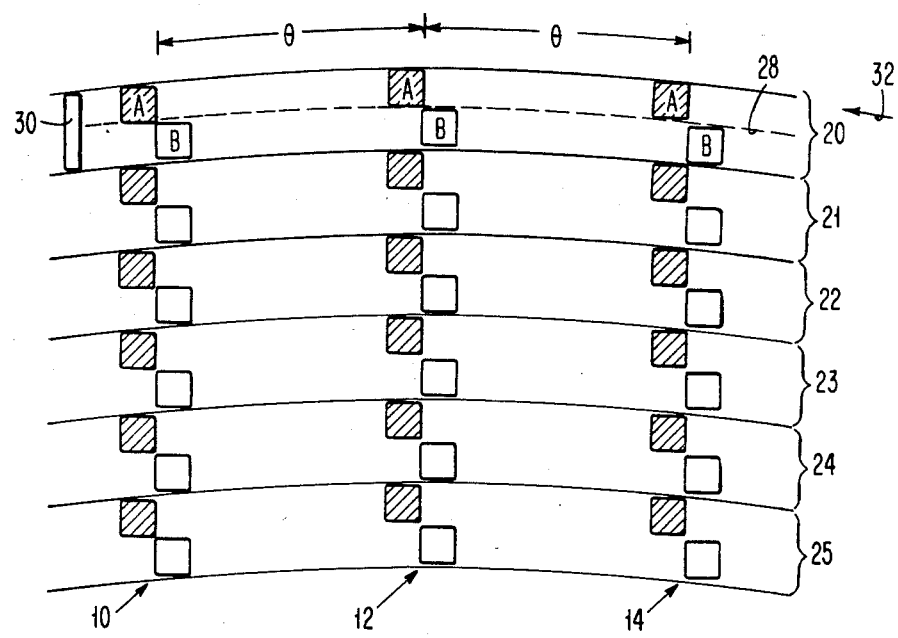
FIG. 1 is a representation of a conventional pattern of sector servo signals on a recording disk.

A portion of a conventional sector servo pattern on a magnetic recording disk is graphically depicted in FIG. 1. Typical servo sectors 10, 12, and 14 are shown equally angularly spaced by an angle $\theta$ and extend radially outwardly from the disk center. While sectors 10, 12, and 14 are shown extending only over six separate data tracks 20, 21, 22, 23, 24, and 25, each of the sectors in actuality extends over the entire radial extent of the effective annular recording surface of the disk. A read/write head is designated 30 and aligned with data track 20, which will move under head 30 in the direction indicated by arrow 32 as the disk rotates.

While there are many techniques for recording specific servo signals in order to assure that the head 30 follows the center line 28 of track 20, the technique illustrated in FIG. 1 utilizes a plurality of pairs of blocks A and B which make up each of the sectors, such as typical sectors 10, 12, and 14. This arrangement of block pairs, and the technique by which the head 30 is maintained over the center line 28 of track 20, is but one of many possible arrangements and does not constitute a part of this invention. As shown in FIG. 1, the servo signals on the disk include blocks of one type of signal, identified as servo block A signals, and blocks of another type of servo signal, identified as servo block B signals. Servo block A signals are spaced from each other along the same data track by the angle $\theta$ between adjacent sectors. Servo block B signals are similarly spaced along the same data track from each other. The block A and block B signals in each sector, such as sector 10 in FIG. 1, are alternately spaced from each other angularly about the center line of each sector and radially about the center line of each data track. The servo system in the disk file operates to sense the signals in block A and block B in each servo sector and attempts to position the magnetic head 30 so as to balance the energy levels of the signals from these blocks to produce a null condition, which would indicate that the head 30 is positioned over the center line 28 of data track 20. During track following, the information detected by the servo system during the reading of information from the blocks A and B of a servo sector is stored and used to control the position of head 30 while the following data portion of the disk located between the adjacent servo sectors is passing beneath it.

Figure 2:
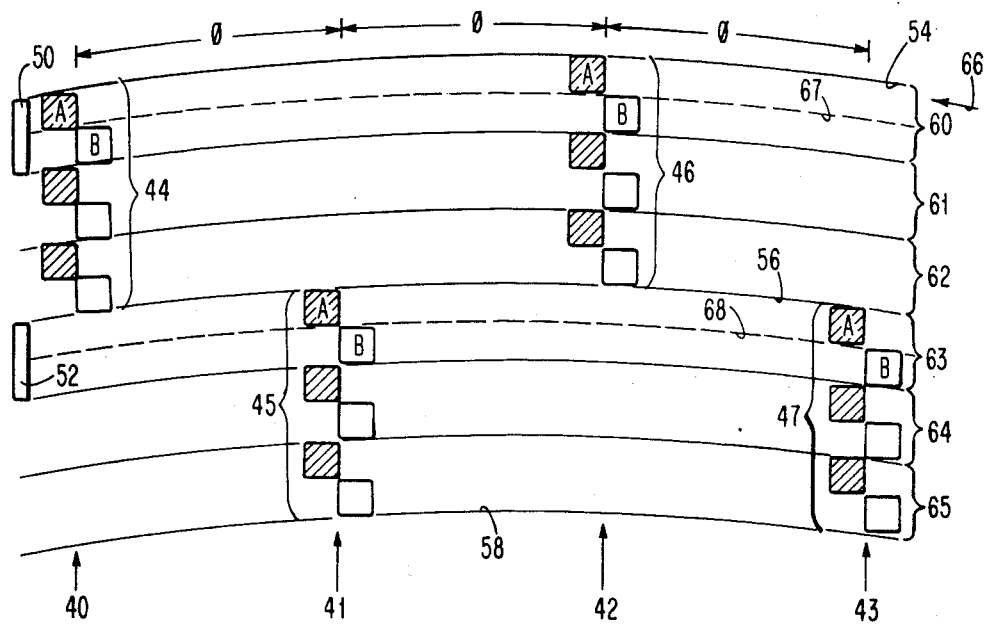
FIG. 2 is a representation of the pattern of servo signals for use with a multiple element head.

The sector servo pattern of the present invention is illustrated in FIG. 2. This servo pattern is used with a multiple element head, such as the dual element head having elements 50 and 52. Each of the sectors 40, 41, 42 and 43 extend radially outwardly from the disk center and are equally angularly spaced by an angle $\phi$. Unlike the sectors of FIG. 1, each of the sectors of the pattern in FIG. 2 comprises a plurality of segments, such as segments 44, 45, 46 and 47 in sectors 40, 41, 42 and 43, respectively, which are spaced radially from adjacent segments within each sector by an amount approximately equal to the radial length of each segment. For example, if the pattern of FIG. 2 were extended to show the entire disk, there would be other segments in sector 40 identical to segment 44 but radially separated by gaps equal to the radial length of the segments. Each segment contains pairs of blocks of servo signals A and B which function as part of the servo system in the manner previously described. The radial length of each of the segments, such as typical segment 44 in sector 40, is equal to the radial spacing between elements 50, 52. Also shown in FIG. 2 are guard bands 54, 56, and 58 which are narrow circumferential bands of unrecordable portions of the disk to prevent data from being written in the space between radially and angularly spaced segments, such as segments 44 and 45. For example, guard band 56 will prevent head element 52 from ever writing over the servo information in sectors 40 and 42 due to track misregistration.

The pattern of servo signals in FIG. 2 controls the positioning and track following of elements 50, 52 in the following manner. As the disk rotates in the direction indicated by arrow 66 the pair of blocks A and B in segment 44 and data track 60 will move under element 50 and provide a signal which indicates the position of element 50 relative to the center line 67 of data track 60. Because elements 50, 52 are spaced apart by a distance equal to an exact integral number of data tracks plus the guard band width, this position information will also indicate the position of element 52 relative to the center line 68 of data track 63. After the blocks A and B of segment 44 have passed under element 50, element 52 is switched in as the active servo element to read the next pair of blocks, namely the blocks A and B in segment 45 and data track 63. Similarly, after these blocks have passed under element 52, element 50 is again switched back as the active servo element for reading the next blocks A and B of servo signals in segment 46 and data track 60. During the time that the data portions of the tracks are passing under elements 50, 52, the most recently read servo sector signal provides information to the control system to position the head so that the elements 50, 52 follow the track center lines 60, 63, respectively.

Figure 3:
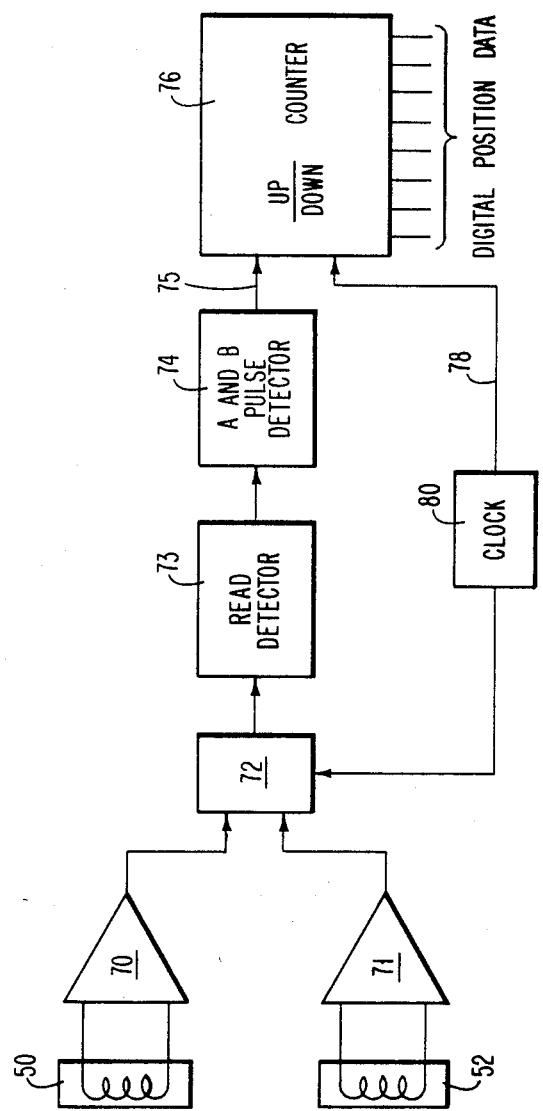
FIG. 3 is a simplified block diagram of one type of circuitry for track following with the use of the servo pattern of FIG. 2.

A simplified block diagram of one form of circuitry required to alternately switch elements 50, 52, for use with the present servo pattern is illustrated in FIG. 3. The signals from blocks A and B of segments 44 and 45 are read by elements 50 and 52, respectively, and amplified by preamplifiers 70, 71. A switching circuitry 72, which is supplied with a clock pulse from clock 80, alternately connects the outputs of preamplifiers 70, 71 to a read detector 73 which receives the servo signals. The output of read detector 73 is supplied to pulse detector circuitry 74 which supplies the signal on output line 75 indicative of each servo pulse detected. Line 75 is supplied to the input of an up/down counter 76. Counter 76 is started at the beginning of a servo sector by a clock signal on input line 78 from clock 80. Assuming that the element 50 is positioned over the center line 67 of the data track 60 as shown in FIG. 2, counter 76 begins counting up as the A block pulses are encountered. As soon as block B pulses of segment 44 are encountered, counter 76 is reversed and begins counting down. After blocks A and B of segment 44 have passed under element 50, the count in the up/down counter 76 provides a digital PES to the servo system to control the radial position of the elements 50, 52 for data track following. When both blocks A and B of segment 44 have passed under element 50, counter 76 is stopped. Then, just before element 52 encounters blocks A and B of segment 45 in data track 63, clock 80 switches element 52 into the circuit as the active element for reading the servo signals. This procedure is continued as the elements 50, 52 are alternately switched to read servo signals from the respective servo segments in their respective data tracks.

It should be apparent that with the servo pattern as thus illustrated and explained, it is possible to provide the same amount of servo information as with the conventional sector servo pattern of FIG. 1, but with substantially reduced surface area of the recording disk. For example, if a dual element head is utilized and the angle $\phi$ in FIG. 2 is maintained equal to the angle $\theta$ in FIG. 1, then the servo pattern of FIG. 2 utilizes only one-half of the surface area required by the conventional sector servo pattern. If, however, it is desired to increase the sampling rate of the servo information, then the pattern in FIG. 2 could be utilized with the angle $\phi$ equal to $\theta/2$. Such a pattern would utilize the same surface area as the conventional sector servo pattern, but would result in a sampling rate twice that of the conventional sector servo, since the angle $\phi$ is equal to one-half the angle $\theta$.

While the present invention has been illustrated with a dual element head for purposes of simplicity of explanation, it should be apparent that the broad concept of the invention is fully applicable to a head having any number of elements. For example, if a three element head were to be utilized, the servo pattern required would be similar to that of FIG. 2 with the exception that the pattern in each sector would be one segment of servo signals followed by two gaps of no servo signals. Thus, if a head having N elements were used in the disk file and the same surface area were to be occupied for servo information as with a conventional sector servo pattern, then the sample rate of servo signals with the pattern of the present invention would be increased by a factor of N. Similarly, if it were desired to maximize the surface area available for recording data, then the use of a head having N elements with the servo pattern of the present invention would result in a surface area for the servo pattern which occupied a fraction equal to only 1/N of the surface area for the conventional sector servo. It should be apparent that the angle $\phi$ in FIG. 2 of this invention does not have to be an integer fraction or multiple of the angle $\theta$ in FIG. 1, since the area allocated to servo information and the servo signal sample rate for a given control system can be selected to any desired and appropriate values.

The servo pattern of the present invention will function with various combinations of elements in the multiple element head. For example, all of the elements could be read/write elements, or a combination of read only and read/write, since data can be written by one of the elements while another of the elements is reading servo signals.

While the preferred embodiments of the present invention have been illustrated in detail, it should be apparent that modifications and adaptations to those embodiments will occur to those skilled in the art without departing from the spirit and scope of the present invention as set forth in the following claims.

What is claimed is:

1. A magnetic recording disk for use with a disk file having a head with multiple elements capable of reading servo signals, the disk having a pattern of radially spaced-apart segments of pre-recorded servo signals identifying data track location lines for track following by the head, each segment being located along one of a plurality of angularly spaced sectors and having a radial length no greater than the spacing between adjacent head elements, the radially inner edge of each segment being generally circumferentially coincident with the radially outer edge of a segment on an adjacent sector.

2. The disk according to claim 1 wherein the disk file includes a dual element head, one of the elements having the capability to write data and read servo signals and the other element having the capability to read servo signals.

3. The disk according to claim 1 wherein the disk file includes a dual element head, each of the elements having the capability to read and write data and read servo signals from the disk.

4. The disk according to claim 1 wherein the disk file includes a dual element head and wherein the radial length of each of the segments is approximately equal to the spacing between the two elements of the dual element head.

5. The disk according to claim 1 further comprising a plurality of circumferential guard bands located between radially adjacent servo segments.

6. The disk according to claim 1 wherein each servo segment further comprises a plurality of pairs of blocks of servo signals, each pair corresponding to one data track, the blocks in each pair being spaced on opposite sides of the data track center line.

7. In a magnetic recording disk file of the type having a rotatable magnetic recording disk containing prerecorded servo signals and a plurality of concentric data tracks, a multiple element head for reading from or writing to the disk, an actuator attached to the head for moving the head radially over the disk surface, and a servo control system, the servo control system including means for interpreting servo signals read by the head elements and generating a signal to the actuator to maintain the elements over the center lines of their respective data tracks during track following, an improvement to the disk file comprising:

a pattern of prerecorded servo signals on the magnetic recording disk for data track following, the pattern further comprising a plurality of radially spaced-apart segments, each segment being located along one of a plurality of angularly spaced sectors and having a radial length no greater than the spacing between adjacent head elements, the radially inner edge of each segment being generally circumferentially coincident with the radially outer edge of a segment on an adjacent sector; and means in the servo control system for alternately switching in elements of the head to read corresponding servo signal segments in the corresponding data tracks as the angularly spaced sectors of the servo pattern pass under the head during disk rotation.

* * * * *